US005346340A

United States Patent [19]

Runge

[11] Patent Number: 5,346,340

[45] Date of Patent: Sep. 13, 1994

[54] TORQUE TRANSMITTING DEVICE

[75] Inventor: Erich Runge, Künzelsau, Fed. Rep. of Germany

[73] Assignee: Plica Werkzeugfabrik AG, Mollis, Switzerland

[21] Appl. No.: 40,123

[22] Filed: Mar. 30, 1993

[30] Foreign Application Priority Data

Mar. 30, 1992 [DE] Fed. Rep. of Germany ....... 4210451

[51] Int. Cl.⁵ ........................ B23B 51/00; B23B 31/02

[52] U.S. Cl. .................................... 408/226; 279/19.3

[58] Field of Search ........................ 279/19, 19.3, 19.5; 408/226

[56] References Cited

U.S. PATENT DOCUMENTS 5,174,698 12/1992 Obermeier ...................... 408/226 X

FOREIGN PATENT DOCUMENTS 71821 2/1983 European Pat. Off. .
9013190 3/1992 Fed. Rep. of Germany .
9305929 4/1993 World Int. Prop. O. .

*Primary Examiner*—Steven C. Bishop
*Attorney, Agent, or Firm*—Tarolli, Sundheim & Covell

[57] ABSTRACT

A device provided on machine tools for transmitting torque onto tools, comprising at least two diametrically opposite rotary driving grooves openly issuing at the end of the tool shank and rotary drivers engaging in these and at least one locking member being disposed in the tool seat to be radially movable for engagement in a locking groove in the tool shank closed at both ends in the axial direction, wherein the rotary drivers comprise a cross section tapered in the direction of the rotary axis to have a stepped shape and, respectively, at least two rotary driving surfaces mutually offset to have a stepped shape for reducing susceptibility to wear. A tool for insertion in such a device.

14 Claims, 2 Drawing Sheets

TORQUE TRANSMITTING DEVICE

The invention relates to a device provided on machine tools, that is hand machine tools in particular, for transmitting torque onto tools, e.g. percussive and/or drilling tools or onto adapters for such tools. The invention further relates to a tool for insertion in machine tools comprising such a device.

A large number of such devices and tools are known, most various systems and mechanisms being used for torque transmission.

A widespread system, which has been proven in practice, has been known from DE-PS 25 51 125. This concerns a device on hand machine tools for transmitting torque onto percussive drilling tools which comprises at least one rotary driving groove openly issuing at the end of the tool shank and ledge-shaped rotary drivers of the tool seat engaging therein, respectively having preferably plain flanks associated therewith and at least one locking member being disposed radially movable in the tool seat for engagement in a locking groove being provided in the tool shank and being closed at both ends in the axial direction. The diametrically opposite rotary driving grooves either concern simple splines or two twin splines situated immediately adjacent to each other, respectively.

However, tools of this system have a drawback in that they may basically also be inserted in tool seats provided according to AT-PS 285 405, wherein they may also inadvertently be inserted in the tool seat in a position where the locking members engage in the rotary driving grooves openly issuing at the end of the tool shank. This involves the danger that the tool disengages when the machine in operation is being retracted since the locking elements may unimpededly slide out of the open rotary driving grooves, which may in turn lead to severe accidents.

It is for all these reasons that an improved system has already been proposed (DE-PS 37 16 915 and DE-OS 38 24 894 as well as EP-PS 0 357 648) according to which the at least two rotary driving grooves openly issuing at the end of the tool shank are distributed over the shank periphery so that there are no two rotary driving grooves diametrically opposite to each other in any event. It was thereby achieved that the tool can never be inserted in a tool seat of different system in a position wherein the locking elements can engage in the rotary driving grooves openly issuing at the end of the shank. It is true that the danger of accidents has been eliminated thereby; however, the system became more susceptible to wear, in those embodiments in particular wherein two or more rotary driving grooves are disposed adjacent to each other on the periphery of the tool shank at small spacing, in which grooves the corresponding number of rotary drivers engages. In these embodiments, there only remains a narrow, relatively weak ledge having a toothed cross-section between two adjacent rotary driving grooves, which may be worn out in tough continuous operation of the device, that is on a hammer drill for instance, or may even be shorn off.

Therefore it is the object underlying the invention to provide a device and a tool of the type indicated at the beginning which are less susceptible to wear in the region of the rotary drivers or the rotary driving grooves, respectively.

This object is met in accordance with the invention in that the rotary drivers diametrically opposite to each other comprise a cross section being tapered to have a stepped shape in the direction to the rotary axis and, respectively, at least two rotary driving surfaces being offset with respect to each other to have a stepped shape in each sense of rotation or, respectively, in that the rotary driving grooves diametrically opposite to each other comprise flanks tapering in the direction of the rotary axis to have a stepped shape and at least two rotary driving surfaces being offset with respect to each other to have a stepped shape in each sense of rotation.

It is thereby achieved that the rotary drivers of the device in accordance with the invention basically act upon at least two rotary driving surfaces of the tool shank being offset with respect to each other to have a stepped shape, the torque transmission being realized via comparably solid components, no weak, rib-like ledges being impinged in a non-positive and/or positive manner and any wearing out or shearing off of the groove flanks in the tool shank being excluded.

Advantageous embodiments of the invention are characterized in that the rotary driving surfaces are situated at differing radial depths, that the rotary driving surfaces are plain surfaces and/or that the rotary driving surfaces extend radially or nearly radially.

The rotary driving grooves of the tool in accordance with the invention preferably comprise a groove bottom being singly or multiply stepped. It is further preferred that the rotary driving grooves be configured symmetrical with respect to a plane extending in the axial direction through the rotary axis, that the groove bottom be subdivided into an odd number $\geqq 3$ of part-regions the radial depths of which are different, but largest in the center region, and/or that all part-regions of the groove bottom are constituted by plain surfaces. However, the groove bottom may also be curved in some or all of its part-regions, preferably such that the surfaces are situated on the generated surfaces of imaginary circular cylinders concentrical with respect to the tool shank.

In a further advantageous embodiment of the tool in accordance with the invention, the rotary driving surfaces are respectively situated in diagonal planes intersecting under center angles of between 90° and 15°. The largest center angle is preferably situated between 65° and 90° the smallest one between 15° and 35°; particularly preferred being a largest angle of $72° \pm 1°$ and a smallest one of $30° \pm 30'$.

An especially preferred tool in accordance with the invention is characterized in that it comprises two locking grooves being opposite on a first diagonal and two opposite rotary driving grooves on a second diagonal being angularly offset by 90° with respect to the first one, that the flanks of the rotary driving grooves are respectively constituted by two radially extending rotary driving surfaces being offset with respect to each other to have a stepped shape and situated at differing radial depths and that the groove bottom is simply stepped and constituted by plain surfaces in its three part-regions, the two outer part-regions being situated at lower radial depth than the center region.

The invention will be explained in detail from the drawing.

Figure 1:
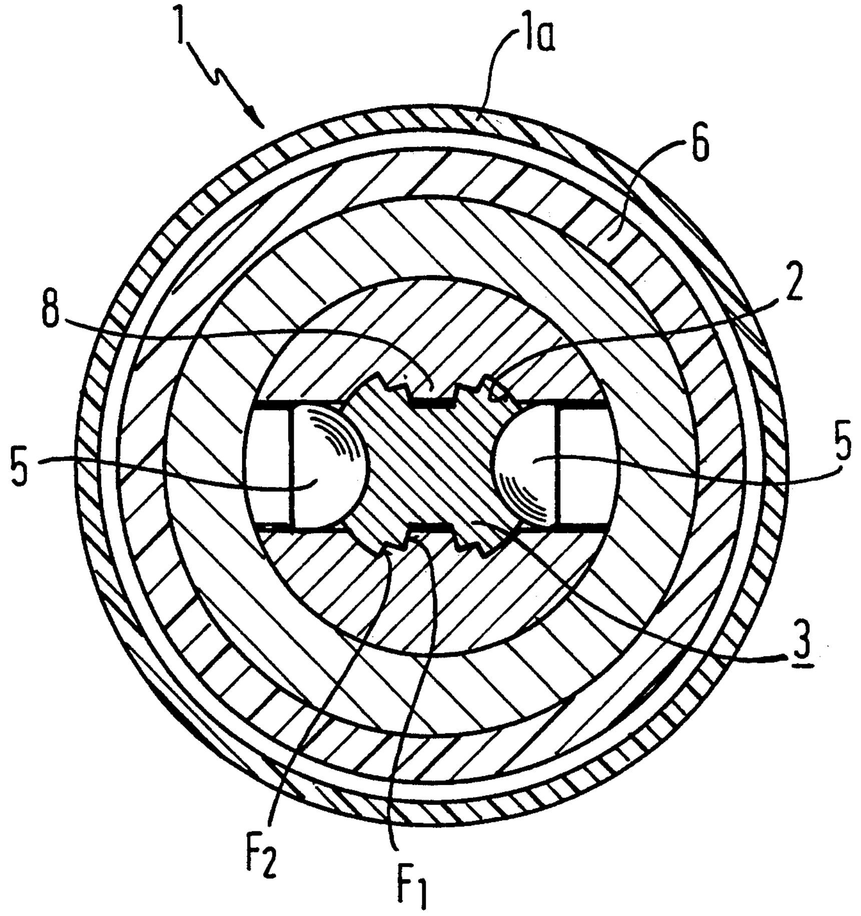
FIG. 1 is a section through a tool seat surrounded by the machine housing wherein a percussive and/or drilling tool or an adapter for attachment of such a tool is situated.
Figure 3:
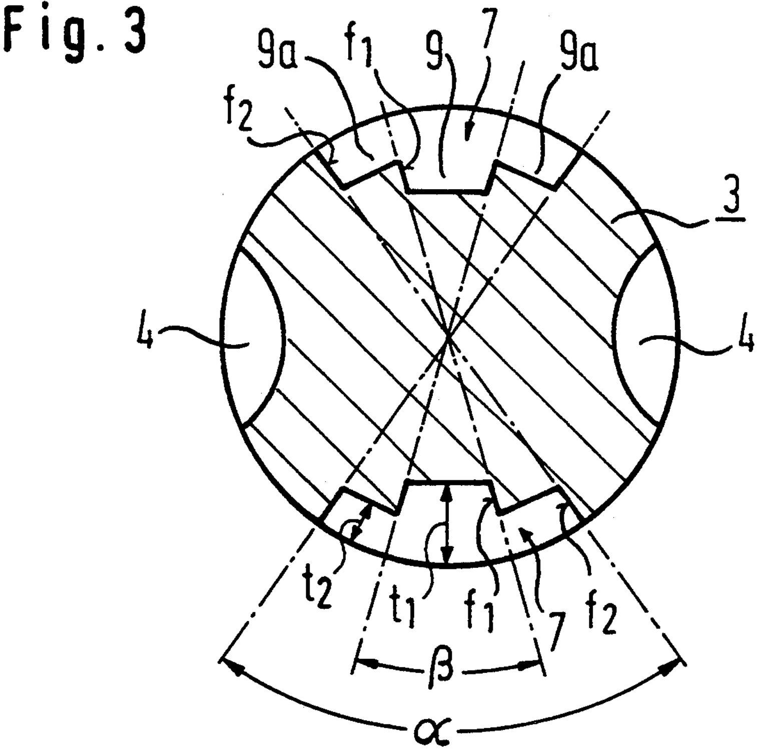
FIG. 3 is a section through the tool shank along line A—A of FIG. 2.

Tool seat 1 (FIG. 1) surrounded by the machine housing 1*a* of a hammer drill is connected with the spindle of the electrically drivable machine (not represented) to be rotationally fixed in a known manner, whereby a torque on the one hand and axial impacts on the other hand may be transmitted onto the tool seat 1. The shank 3 of a tool, for instance a drill, chisel or an adapter, which may in its turn be provided with a tool seat of the same or a different system, e.g. with a round thread is pushed into the concentrical receiving bore 2 of seat 1. Two locking grooves 4 closed at both ends in the axial direction are disposed on a first diagonal on tool shank 3 to be opposite to each other, wherein associated locking members 5 of seat 1 engage. Locking members 5 may radially be moved out of locking grooves 4 via axial displacement of a sleeve 6 so that the tool may be pulled out together with shank 3. Two rotary driving grooves 7 (FIG. 3) being opposite to each other and openly issuing at the end of the shank are disposed on a second diagonal being angularly offset by 90° with respect to the first one, wherein complementarily shaped rotary drivers 8 engage.

In the drawn embodiment, rotary driving grooves 7 are splines the cross section of which is modified such that their flanks taper in the direction towards the rotary axis to have a stepped shape, whereby at least two rotary driving surfaces $f_1$, $f_2$ being mutually offset to have a stepped shape are respectively formed in each sense of direction to which corresponding rotary driving surfaces $F_1$, $F_2$ of complementarily formed rotary drivers 8 correspond.

Rotary driving surfaces $F_1$, $f_1$; $F_2$, $f_2$ are located at differing radial depths and are preferably, but not necessarily formed as plain surfaces to extend radially or nearly radially, at least.

Figure 2:
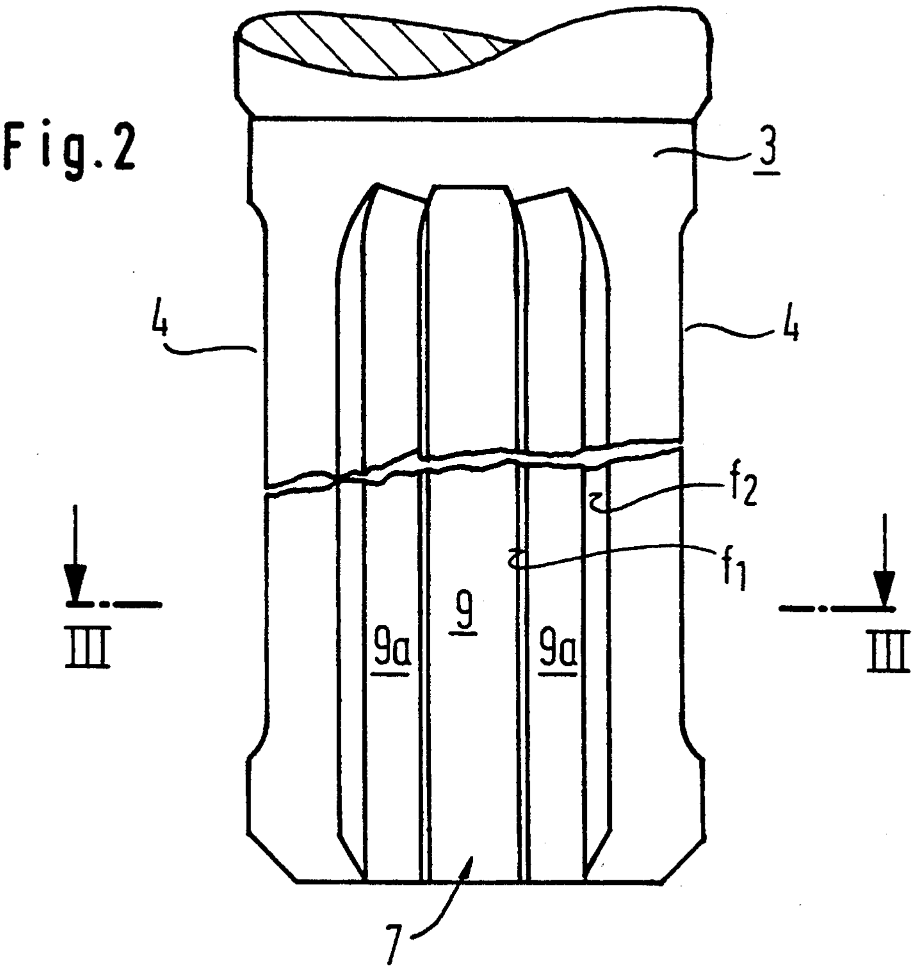
FIG. 2 is a plan view of the shank inserted in the seat according to FIG. 1.

Rotary driving grooves 7 comprise a simply stepped groove bottom (FIG. 2, FIG. 3) being subdivided into three part-regions having differing radial depths, namely a center region 9 in the larger radial depth $t_1$ and, laterally thereof and symmetrically formed, two part-regions 9*a* having a smaller radial depth $t_2$. The radial depth of center region 9 is always the largest ($t_1 > t_2$). Thus, rotary driving grooves 7 are formed symmetrically with respect to a plane extending in the axial direction through the rotary axis. All part-regions 9, 9*a* of the groove bottom are constituted by plain surfaces in the drawn embodiment. However, the part-regions of the groove bottom may as well be constituted by curved surfaces in other (non-represented) embodiments, that is by surfaces in particular which are situated on the generated surfaces of imaginary circular cylinders concentrical with respect to the tool shank.

In the drawn embodiment, the low-lying rotary driving surfaces $f_1$ of rotary driving grooves 7 are situated in diagonal planes intersecting under a center angle $\beta = 30° + 30'$ whereas rotary driving surface $f_2$ lying at smaller depths are situated in diagonal planes intersecting under a center angle of $\alpha = 72° \pm 1°$.

The invention has been explained in the foregoing upon reference to a preferred embodiment as represented in the drawing; however, the invention also incorporates such embodiments wherein rotary drivers 8 and rotary driving grooves 7 comprise different dimensions, surface and angle ratios. In a further advantageous embodiment for instance, the two diametrically opposite rotary drivers or rotary driving grooves, respectively, do not possess similar, but possess dissimilar profiles in order to achieve that a tool together with shank 3 may only be inserted in receiving bore 2 of seat 1 in one single position. Differing profiles may for instance be realized via differing widths and/or differing radial depths of the rotary drivers or the rotary driving grooves formed to be complementary with these, respectively.

I claim:

1. A device provided on machine tools for transmitting torque onto tools, comprising at least two diametrically opposite rotary driving grooves (7) openly issuing at the end of the tool shank (3) and rotary drivers (8) of the machine tool seal (1) engaging in these and at least one locking member (5) being disposed in the tool seat (1) to be radially movable for engagement in a locking groove (4) in the tool shank (3) axially closed at both ends, characterized in that each rotary driver (8) is symmetrical about a first plane which extends in an axial direction through a rotary axis and through a center of each of the rotary drivers (8), the rotary drivers (8) are symmetrical about a second plane which extends in an axial direction through the rotary axis, the first and second planes are perpendicular to each other, and each of the rotary drivers (8) have a cross-section which includes a step-shaped taper at each of two flanks, and at least two mutually offset driving surface (F1, F2) at each of the step-shaped tapers.

2. A device according to claim 1, characterized in that the rotary driving surfaces ($F_1$, $F_2$) are located at different radial depths.

3. A device according to claim 1, characterized in that the rotary driving surfaces ($F_1$, $F_2$) are plain surfaces.

4. A device according to claim 1, characterized in that the rotary driving surfaces ($F_1$, $F_2$) extend radially or nearly radially.

5. A tool for insertion in the receiving bore (2) of a tool seal (1) of a machine tool comprising at least two rotary drivers (8) diametrically opposite to each other and at least one locking member (5) being disposed to be radially movable, said tool having at least two rotary driving groves (7) diametrically opposite to each other, openly issuing at the end of the tool shank (3) and at least one locking groove (4) in the took shank (3) closed at both ends in the axial direction, characterized in that each groove (7) is symmetrical about a first plane which extends in an axial direction through a rotary axis and through a center of each of the rotary driving grooves (7), the rotary driving grooves (7) are symmetrical about a second plane which extends in an axial direction through the rotary axis, the first and second planes are perpendicular to each other, and each of the rotary driving grooves (7) have a cross-section which includes a step-shaped taper at each of two flanks, and at least two mutually offset driving surfaces ($f_1$, $f_2$) at each of the step-shaped tapers.

6. A tool according to claim 5, characterized in that the rotary driving surfaces ($f_1$, $f_2$) are located at differing radial depths.

7. A tool according to claim 5 or 6, characterized in that the rotary driving surfaces ($f_1$, $f_2$) are plain surfaces.

8. A tool according to claim 5, characterized in that the rotary driving surfaces ($f_1$, $f_2$) extend radially or nearly radially.

9. A tool according to claim 5, characterized in that the rotary driving grooves (7) comprise a simply or multiply stepped bottom (9, 9a).

10. A tool according to claim 9, characterized in that the groove bottom is subdivided into an odd number ≧3 of part-regions (9, 9a) the radial depths ($t_1$, $t_2$) of which are different, but largest ($t_1 \geqq t_2$) in the center region (9).

11. A tool according to claim 9, characterized in that all part-regions (9, 9a) of the groove bottom are constituted by plain surfaces.

12. A tool according to claim 8, characterized in that the rotary driving surfaces ($f_1$, $f_2$) are respectively situated in diagonal planes intersecting under center angles ($\alpha$, $\beta$) situated between 90° and 15°.

13. A tool according to claim 12, characterized in that it comprises two locking grooves (4) being opposite on a first diagonal and two opposite rotary driving grooves (7) on a second diagonal being angularly offset by 90° with respect to the first one, that the flanks of the rotary driving grooves (7) are respectively constituted by two radially extending rotary driving surfaces ($f_1$, $f_2$) being offset with respect to each other to have a stepped shape situated in differing radial depths, that the groove bottom is simply stepped and constituted by plain surfaces in its three part-regions (9, 9a), the two outer part-regions (9a) being situated at lower radial depth ($t_2$) than the center region (9).

14. A tool according to claim 13, characterized in that the largest center angle ($\alpha$) is 72°±1° and the smallest center angle ($\beta$) is 30°±30′.

* * * * *

UNITED STATES PATENT AND TRADEMARK OFFICE

CERTIFICATE OF CORRECTION

PATENT NO. : 5,346,340

DATED : September 13, 1994

INVENTOR(S) : Erich Runge

It is certified that error appears in the above-indentified patent and that said Letters Patent is hereby corrected as shown below:

Column 4, line 16, change "seal" to --seat--.

Column 4, line 42, change "seal" to --seat--.

Column 4, line 46, change "groves" to --grooves--.

Column 4, line 48, change "took" to --tool--.

Column 4, line 64, after "5" delete --or 6--.

Signed and Sealed this

First Day of August, 1995

Attest:

Bruce Lehman

BRUCE LEHMAN

*Attesting Officer*

*Commissioner of Patents and Trademarks*